United States Patent [19]

Ono et al.

[11] Patent Number: 4,775,274
[45] Date of Patent: Oct. 4, 1988

[54] RING-SHAPED MEMBER SUPPLYING APPARATUS

[75] Inventors: Koichi Ono; Koji Kobayashi, both of Iwatsuki, Japan

[73] Assignee: Hokkai Can Co., Ltd., Tokyo, Japan

[21] Appl. No.: 93,155

[22] Filed: Sep. 2, 1987

Related U.S. Application Data

[63] Continuation of Ser. No. 783,466, Oct. 3, 1985, abandoned.

[30] Foreign Application Priority Data

Oct. 3, 1984 [JP] Japan .................. 59-206183

[51] Int. Cl.⁴ .................................. B21D 51/44
[52] U.S. Cl. ........................... 413/66; 221/10; 221/211
[58] Field of Search .............. 413/12, 14, 66, 45, 413/47, 48, 52; 221/10, 11, 222, 211

[56] References Cited

U.S. PATENT DOCUMENTS

| | | | |
|---|---|---|---|
| 1,658,837 | 2/1928 | Derby | 221/10 |
| 1,667,483 | 4/1928 | Leof | 221/222 |
| 2,445,713 | 7/1948 | Glassner | 221/211 |
| 2,472,664 | 6/1949 | Krueger | 53/88 |
| 2,563,654 | 8/1951 | Mackin et al. | 221/211 |
| 2,609,779 | 9/1952 | Goldsworthy | 221/10 |
| 2,647,673 | 8/1953 | Galik | 221/211 |
| 3,225,960 | 12/1965 | Whelan | 221/10 |
| 3,618,550 | 11/1971 | Mojden | 413/47 |
| 4,081,945 | 4/1978 | Colvert | 414/128 |

Primary Examiner—Frederick R. Schmidt
Assistant Examiner—Robert Showalter
Attorney, Agent, or Firm—Birch, Stewart, Kolasch, & Birch

[57] ABSTRACT

A ring-shaped member supplying apparatus including a storage section for storing a large number of flexible ring-shaped members stacked in layers and supporting the ring-shaped members so that the lowermost one of the stacked ring-shaped members is held by plural engaging members. A takeout device is provided for drawing out the lowermost one of the stacked ring-shaped members in the storage section, by suction, so as to separate the ring-shaped member from the remaining members and transferring the ring-shaped member to a conveying passage. A detecting device is provided for detecting an amount of the stacked ring-shaped members in the storage section. A supplementing supply is provided for replenishing an amount of the ring-shaped members in response to a decrease in an amount of the ring-shaped members in the storage section so that the amount of the ring-shaped members in the storage section is controlled to be in a predetermined range.

4 Claims, 5 Drawing Sheets

RING-SHAPED MEMBER SUPPLYING APPARATUS

This application is a continuation of application Ser. No. 783,466, filed on Oct. 3, 1985, now abandoned.

BACKGROUND OF THE INVENTION

1. Field of the Invention

This invention relates to an apparatus for intermittently, one-by-one supplying ring-shaped members made of thin plates of soft synthetic resin or the like. More particularly, the invention is directed to an apparatus for intermittently, one-by-one supplying, ring-shaped opening members for braking open a covering panel member for an easy open type can closure

2. Description of Background Art

As for an easy open type can closure, there has been hitherto proposed known various conventional closures for hermetically containing substances such as milk, coffee or materials to be maintained in a moisture free environment. One such closure, for example, is disclosed in Japanese Utility Model Registration Application Publication No. Sho 57-177937. The easy open type can closure disclosed in the Japanese Application, comprises, as shown in FIG. 7, a closure main body A and a ring-shaped opening member c adhered to a covering panel member b of the closure main body A. The closure main body A is composed of an outline formed circular frame a made of a metallic plate such as a tin plate or the like and the panel member b comprising a lamination of an aluminium foil and a thermoplastic synthetic resin layer. The ring-shaped opening member c is provided with a holdable tab member d projecting into a circular opening surrounded by an outer part e thereof, and the tab member d has a central hole f for opening the can closure. The ring-shaped opening member b is pulled outwards by holding the tab member d with an individual's finger positioned in the central hole f and thereby the panel member b is broken open along the shape of the ring-shaped opening member b and is removed.

For manufacturing the can closure of the above type, an apparatus can be constructed and provided with a storage means for storing a large number of flexible ring-shaped members c stacked in layers and supporting them in such a manner that the lowermost one thereof is held by plural engaging members. A takeout means could be provided for drawing out the lowermost one of the stacked ring-shaped members c in the storage means by suction for separating the ring-shaped member from the remaining members and for transferring it to a conveying passage in order to be thereafter attached to the panel member b of the closure main body A.

In order to manufacture the can closures of this type at a high efficiency by using the above described apparatus, a problem arises in that when the stacked ring-shaped members in the storage means are taken out one-by-one by suction applied by the takeout means, it often happens that plural ring-shaped members are simultaneously dropped onto the conveying passage because of the flexibility or pliability of the ring-shaped members. In other words, it is difficult to take out the ring-shaped members from the storage means one-by-one accurately or reliably and position the members onto the conveying passage. Accordingly, manufacturing the can closures of this type at a high efficiency cannot be achieved.

SUMMARY AND OBJECTS OF THE INVENTION

This invention has for its object to provide a ring-shaped member supplying apparatus which can remove the foregoing difficulty with the foregoing apparatus, and makes it possible to reliably supply flexible ring-shaped members one-by-one.

According to this invention, an apparatus is provided with a storage means for storing a large number of flexible ring-shaped members stacked in layers and supported in such a manner so that the lowermost one of the stacked ring-shaped members is held by plural engaging members. A takeout means is provided for drawing out the lowermost one of the stacked ring-shaped members in the storage means by suction so as to separate it from the remaining members and transferring it onto a conveying passage. A detecting means is provided for detecting a quantity of the stacked ring-shaped members in the storage means. A supplementing means is provided for replenishing an amount of the ring-shaped members in response to a decrease in an amount of the ring-shaped members in the storage means so that the amount of the ring-shaped members in the storage means may be controlled to be in a range of a predetermined amount thereof.

This invention has been made based on a finding that if the amount of the stacked ring-shaped members stacked in the storage means exceeds a predetermined number the lowermost layer ring-shaped member is burdened with a comparatively large load of the other stacked ring-shaped members positioned thereabove and consequently the close contact degree between the lowermost layer ring-shaped member and the other ring-shaped members is too large, so that it becomes impossible to separate only the lowermost layer ring-shaped member from the other ring-shaped members by suction of the takeout means. As a result thereof, the present invention provides an apparatus arranged so that there is provided a detecting means and a supplementing means which serve to control an amount of the stacked ring-shaped members in the storage means so as not to exceed a predetermined amount.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMETS

Figure 1:
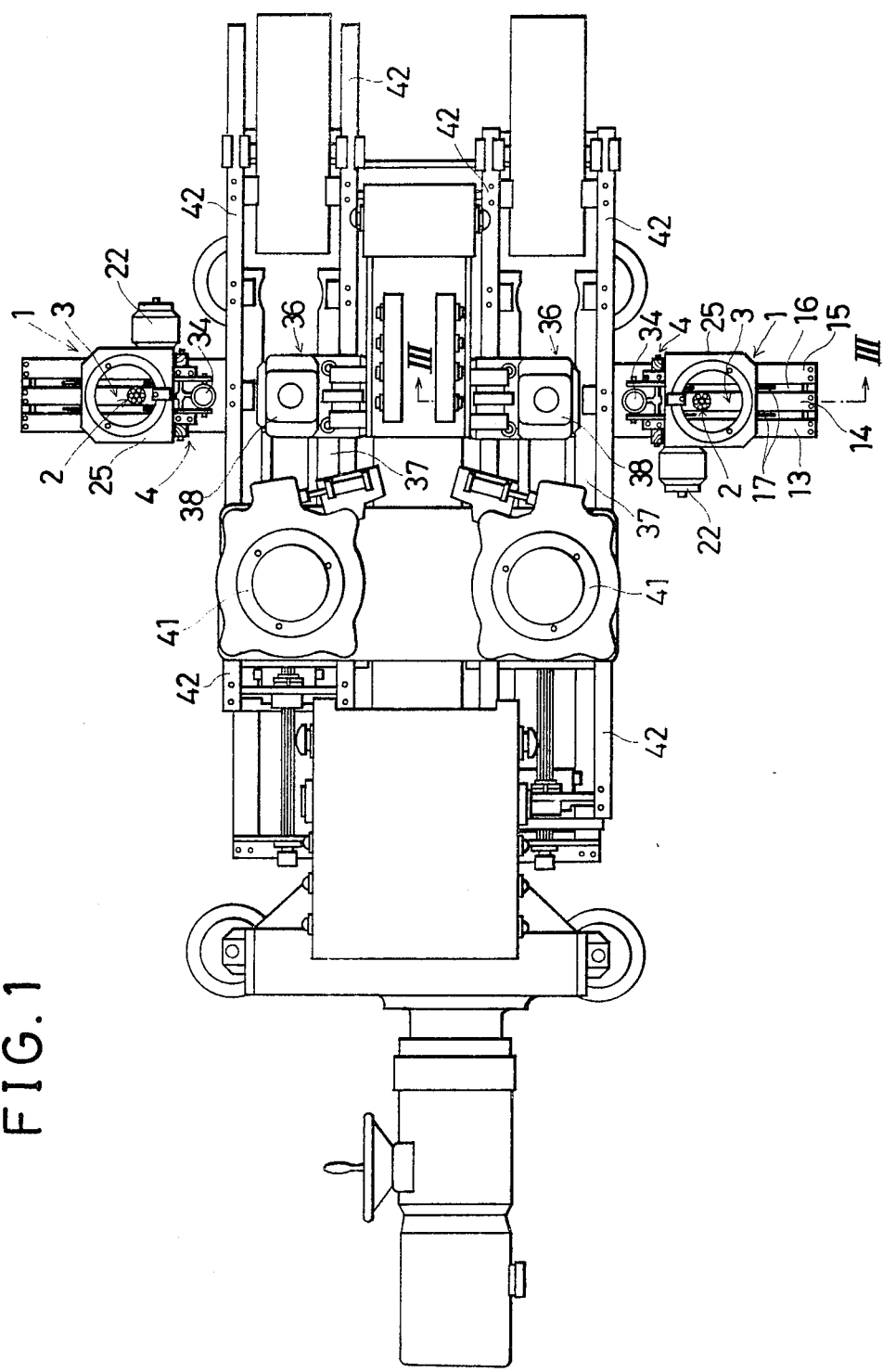
FIG. 1 is a top plan view of a can closure manufacturing apparatus provided with one embodying apparatus of this invention.
Figure 7:
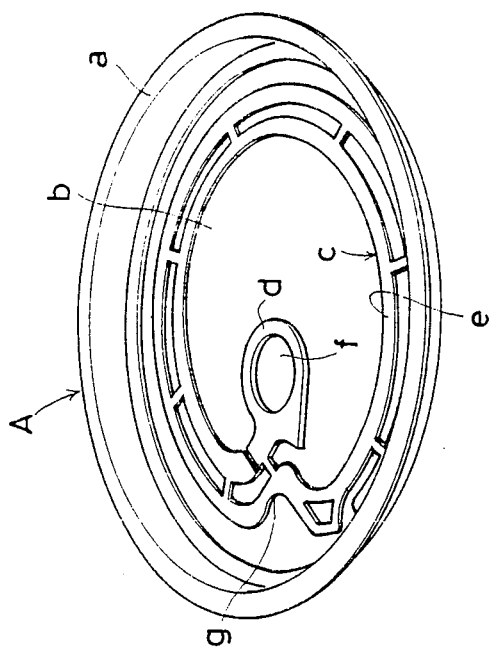
FIG. 7 is a perspective view of a can closure manufactured by the apparatus of FIG. 1.

FIG. 1 shows a manufacturing apparatus provided with the present invention for manufacturing a can closure shown in FIG. 7. The illustrated manufacturing apparatus includes two manufacturing apparatus which are the same in construction as shown in the upper portion and the lower portion of this figure. Hereinafter, a detailed explanation will be provided for one of the manufacturing apparatus with reference to FIGS. 2-6.

Figure 2:
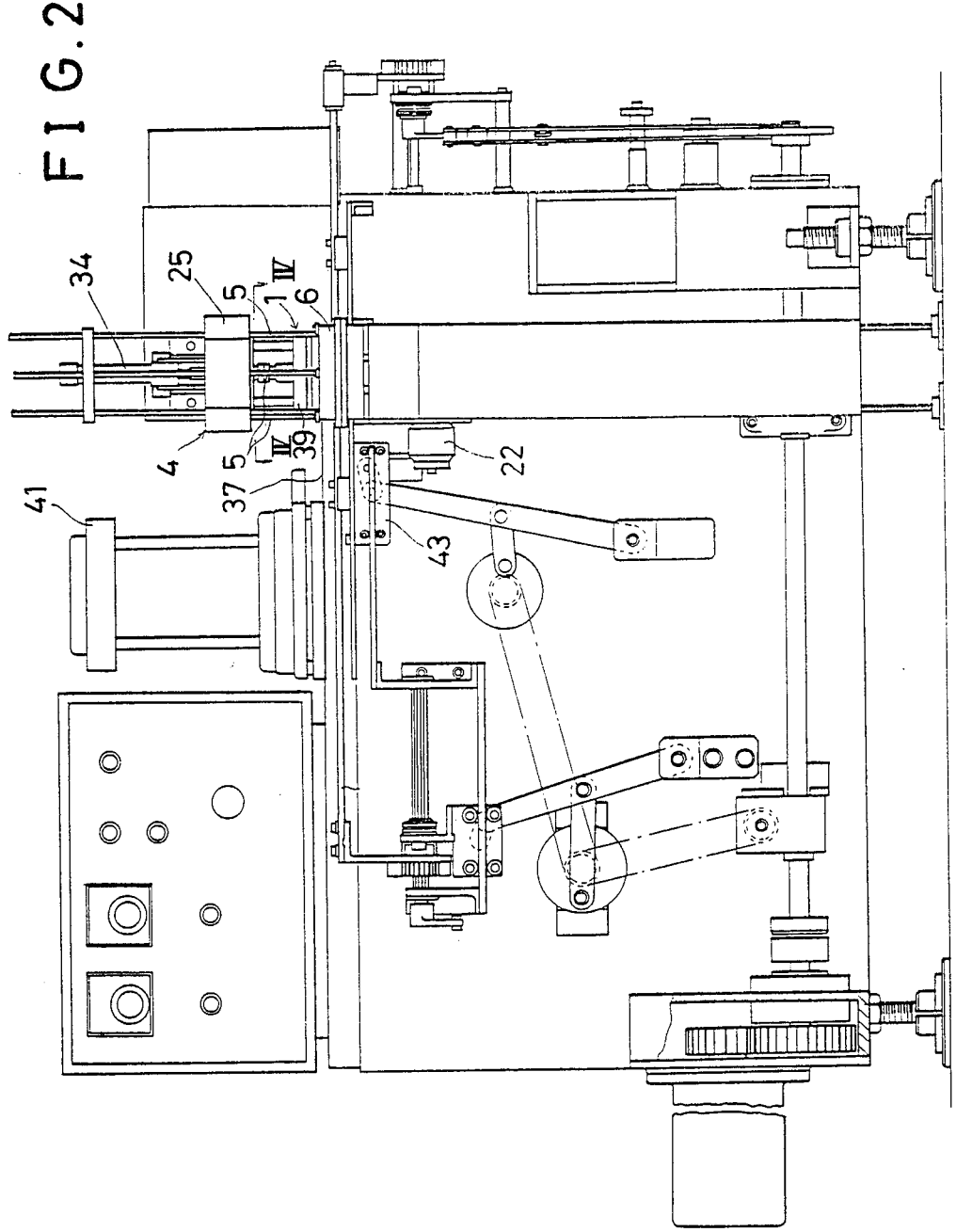
FIG. 2 is a front view thereof.
Figure 3:
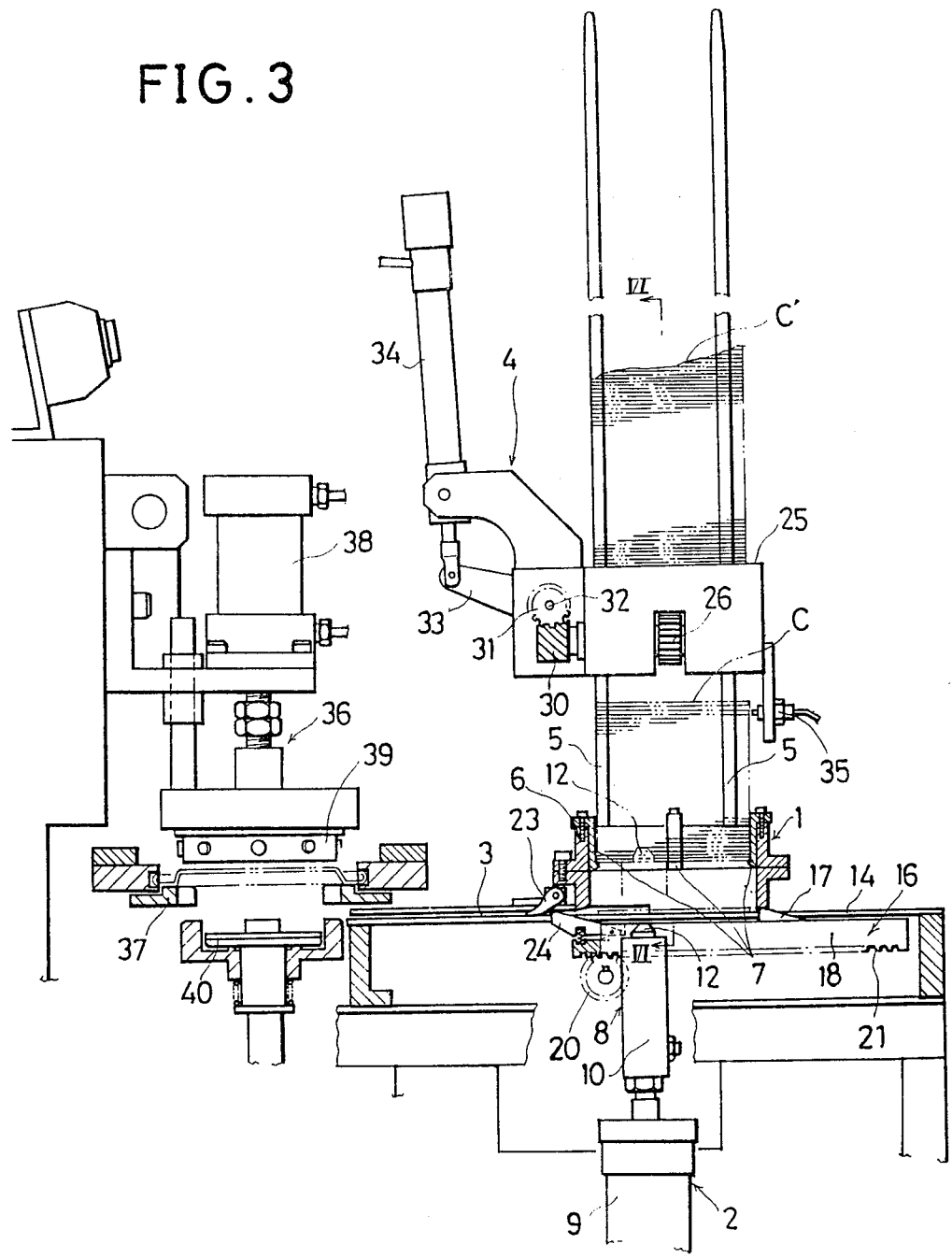
FIG. 3 is a sectional view taken along the line III—III in FIG. 1.

Referring to FIGS. 2-6, especially in FIG. 3, a storage means 1 holds a plurality of ring-shaped member c. The ring-shaped members c are as the opening members for breaking open the panel member b of the can closure A as shown in FIG. 7. The members c are stored in a stacked layer condition. A takeout means 2 is provided just below the storage means 1 and serves to draw out the ring-shaped members c in the storage means 1 one-by-one and for transferring it onto a conveying passage 3. A supplementing means 4 replenishes additional ring-shaped members c to the storage means 1.

The ring-shaped member c is composed of a ring-shaped outer part e and a holdable tab member d which has a central hole f therein and which projects into a circular space surrounded by the ring-shaped outer part e as the foregoing opening member for opening the can closure, as shown in FIG. 7.

The storage means 1 is constructed so that a space is provided which is sufficient for placing the ringshaped members c one upon another in layers. Three guide posts 5 are mounted on a base frame 6 for supporting lower end portions of the guide posts 5 on its inner circumferential surface with four engaging claw members 7 for supporting the ring-shaped members c in such a manner that the lowermost layer ring-shaped member c is held, at its peripheral portion by the claw members 7 from below.

The takeout means 2 is provided with a suction means 8 which is arranged so as to be located below the conveying passage 3 when not operated. An air cylinder means 9 elevates the suction means 8 towards the opening d of the lowermost layer ring-shaped member c in the storage means 1. As shown clearly in FIGS. 3-5, the suction means 8 is provided with a tubular suction rod 10 having a top surface provided with suction openings 11 disposed annularly and a central portion surrounded by the suction openings 11. A projectin 12 is insertable into the foregoing hole f of the tab member of the ring-shaped member c.

As shown clearly in FIG. 2 and FIGS. 3-5, the conveying passage 3 is a horizontally extended passage positioned just below the storage means 1. A conveying surface is formed by supporting plates 13, 14, 15 having respective gaps therebetween. A conveying means 16 conveys the ring-shaped member c dropped from the storage means 1 and resting on the conveying surface. The supporting plate 14 includes a hole 14a for passing the suction rod 10 therethrough.

Figure 5:
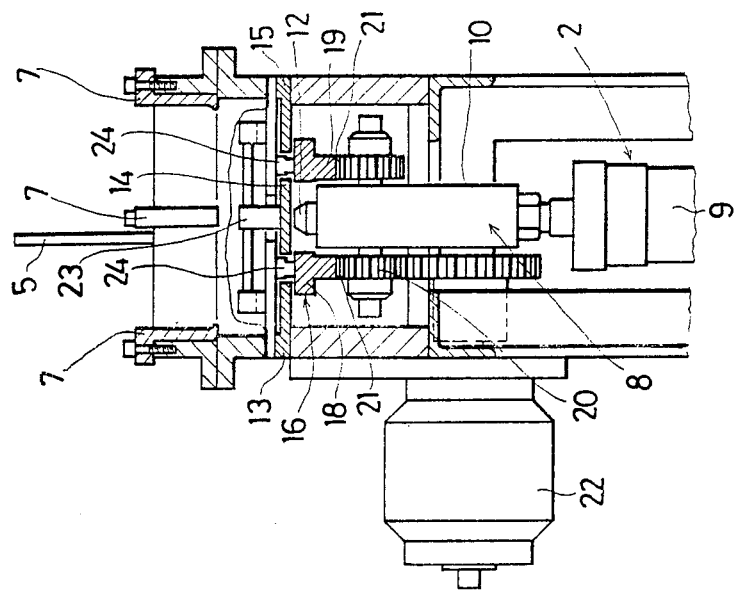
FIG. 5 is a sectional view taken along the line V—V in FIG. 4.
Figure 4:
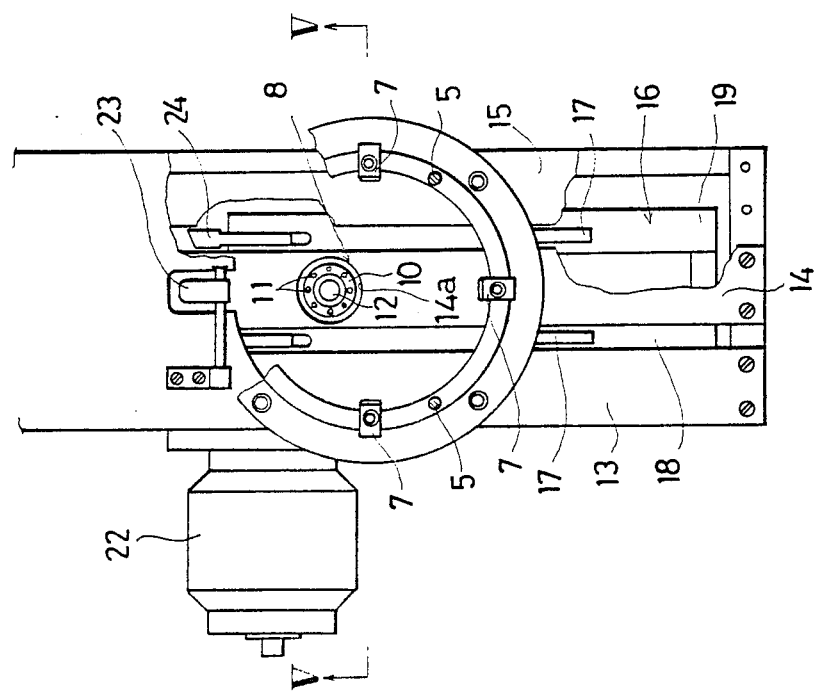
FIG. 4 is a sectional view taken along the line IV—IV in FIG. 2.

As shown in FIGS. 3-5, the conveying means 16 is constructed so that a pair of conveying rods 18, 19 include engaging members 17 projecting upwards beyond the conveying surface through the gaps between the respective plates 13, 14, 15 of the conveying passage 3. The conveying means 16 is movable to reciprocate, by driving of a hydraulic motor 22, along the conveying passage 3 through a pinion 20 and a rack 21. Referring to FIGS. 3 and 4, numeral 23 denotes a stopper which is brought in pressure contact with the conveying surface of the conveying passage 3, so as to serve in such a manner that, when the ring-shaped member c is conveyed to the left side in FIG. 3, beyond the stopper 23 by the conveying means 16 and thereafter the conveying rods 18, 19 are returned to the original positions thereof, it prevents the ring-shaped member c from being returned simultaneously therewith. A feeding pusher member 24 urges against each of front end portions of the conveying rods 18, 19 so that its forward end portion may project upwards above the conveying surface, and thus the feeding pusher member 24 serves in such a manner that the ring-shaped member c conveyed to a position in front of the stopper 23 is pushed further forwards thereby.

The supplementing means 4 is so arranged as to replenish a predetermined number of the ring-shaped members c' in response to a decrease in an amount of the ring-shaped members c stored in the storage means 1, and is provided at a position corresponding to the upper portions of the guide post 5.

Figure 6:
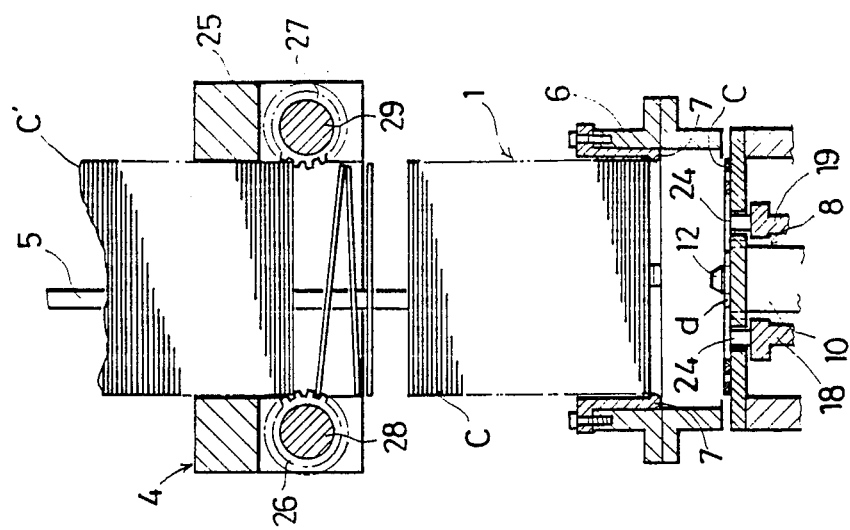
FIG. 6 is a sectional view taken along the line VI—VI in FIG. 3.

A base frame 25 of the supplementing means 4 is formed so that the ring-shaped member c' stacked in layers are insertable therethrough, and, as shown in FIGS. 3 and 6, spur gear members 26, 27 are rotatably provided through rotary shafts 28, 29 at mutually opposite positions facing one another in the wall of the base frame 25. The two rotary shafts 28, 29 are arranged to be driven by an air cylinder means 34 which rotates, through a ratchet mechanism (not illustrated) and a link 33. Screw gears 30, 30 are provided on the same end portions of the shafts 28, 29. A rotary shaft 32 includes screw gears 31, 31 provided on both end portions which are meshed with the screw gears 30, 30 so that the spur gear members 26, 27 may be rotated at equal speeds and in the same directions. The supplementing means 4 is so operated that the lowermost layer ring-shaped member c' is held by being meshed, at its peripheral portion, with the foregoing spur gear members 26, 27.

A detecting device 35 is provided for detecting a predetermined height position of the ring-shaped member c stored in the storage means 1. When the detecting device detects that the height of the stacked ring-shaped member c is lower than the predetermined height position, the cylinder means 34 of the supplementing means 4 is driven to advance and is then returned to the original position.

Referring to FIGS. 2 and 3, a fushion adhesion pressing means 36 places the ring-shaped member c on the closure main body A by adhering by fusion and is provided with a hot plate means 39 located above another conveying passage 37 for the closure main body The conveying passage 37 extends at a right angle with the conveying passage 3 and is arranged to be moved upwards and downwards by an air cylinder means 38. Additionally, a pressing means 40 is provided for bringing the ring-shaped member c into pressure contact with the closure main body A.

Referring to FIGS. 1 and 2, a supply means 41 supplies the closure main body A wherein the closure main bodies A may be dropped one-by-one for being supplied to the conveying passage 37. Referring to FIG. 2, a thrusting means 42 delivers the closure main body A dropped from the supply means 41 to the conveying passage 37.

A transfer means 43 transfers the closure main body A delivered to the passage 37 to the fusion adhesion pressing means 36 and further transfers the closure main body A adhered with the ring-shaped member c by the fusion adhesion pressing means 36.

Next, the operation of the foregoing embodying apparatus of the present invention will be explained as follows:

As shown clearly in FIGS. 3 and 6, the ring-shaped members c of a predetermined number in their stacked layer condition are held in the storage means 1 in such a manner that the lowermost layer one is received by the engaging claw members 7. In this case, all the stacked ring-shaped members c are kept equal in circumferential phase one to another in such a way that each member is brought into engagement, at its recess g formed in the outer circumferential edge thereof as shown in FIG. 7 with a predetermined one of the guide posts 5.

In this arrangement, the takeout means 2 is operated and the suction rod 10 is moved upwards by the air cylinder means 9 until the projection 12 of the suction rod 10 inserts into the hole f of the tab member d of the lowermost stacked ring-shaped member c stored in the storage means 1. At that time the projection member d is attracted, by suction, to the suction openings 11. Under this condition, the suction rod 10 is then lowered by the air cylinder means 9, and accordingly the lowermost layer ring-shaped member c attracted by suction thereto is so drawn downwards, thereby as to be released from its engagement with the engaging claw members 7 of the storage means 1 and is transferred onto the conveying passage 3. During the operation wherein the suction rod 10 is further lowered to a lower position than the conveying surface of the conveying passage 3, the tab member d is separated from the suction rod 10 because the ring-shaped member c is brought into engagement with the conveying passage.

Next, the conveying means 16 is operated so that the conveying rods 18, 19 are moved towards the fusion adhesion pressing means 36 through the pinion 20 and the rack 21 by the driving of the hydraulic motor 22, and the ring-shaped member c on the conveying passage 3 is conveyed by means of the engaging members 17 of the conveying rods 18, 19, beyond the stopper 23. The conveying rods 18, 19 are thereafter returned to the original positions thereof by reverse rotation of the pinions 20, 20. However, the ring-shaped member c is left as it is because its backward movement is stopped by the stopper 23.

Thereafter, in almost the same manner as above, the takeout means 2 is operated, and the lowermost one of the stacked ring-shaped members c stored in the storage means 1 is drawn downwards by suction and is transferred onto the conveying passage 3. Then, again, the conveying means 16 is operated, and thereby the ring-shaped member c transferred onto the conveying passage 3 is conveyed by the conveying rods 18, 19. On this occasion, the ring-shaped member c earlier conveyed and left on the conveying passage is pushed forwards by the feeding pusher member 24 provided on the forward end portions of the conveying rods 18, 19, and is fed into the fusion adhesion pressing means 36.

Thus, the ring-shaped member c in the pressing means 36 is adhered, by fusion and under pressure, to the closure main body A by operation of the fusion and under pressure, to the closure main body A by operation of the fusion adhesion pressing means 36, and thereafter a resultant can closure is transferred by the transfer means 43.

At the time of completion of the foregoing delivery of the can closure, the takeout means 2 is similarly operated to draw out the lowermost one of the ring-shaped member c from the storge means 1, onto the conveying passage and the conveying means 16 is operated to send the ring-shaped members c to the means 36. The above operations are then repeated.

During the above repeated operation, the number of the stacked ring-shaped members c in the storage means is decreased. When the height positon of the uppermost layer of the stacked ring-shaped members c is changed to become lower than the predetermined height position of the position detecting means 35, a signal of the position detecting means 35 is issued and thereby the supplementing means 4 is operated to replenish the ring-shaped member c' to the storage means 1. Namely, by the detecting signal of the position detecting means 35, the air cylinder means 34 of the supplementing means 4 is operated for a predetermined time, and thereby the spur gear members 6, 27 are rotated through the link 33 and the screw gears 30, 32, and the ring-shaped members c' in the supply means 4 that are held by being meshed with the spur gear members 26, 27 are dropped into the storage means 1 and thus a predetermine number of ring-shaped members c' are supplied to the storage means 1 gradually in sequence.

Thus, the decreased height position of the stacked ring-shaped members c in the storage means 1 is restored to a predetermined height position. Consequently, the ring-shaped members c of a predetermined number are always stored in the storage means 1, and accordingly the lowermost one thereof is not applied with any sudden heavy load. Thus, it can be assured that the ring-shaped members c are taken out from the storage means 1 to the conveying passage 3 one-by-one by the takeout means 2.

In the foregoing embodying apparatus, the takeout means 2 is constructed so as to suck the tab member d of the ring-shaped members c, but the construction thereof is so modified as to suck the circumferential outer part e of the ring-shaped member c. However, the former is preferable, because it is smaller in size than the latter.

Thus, according to the present invention, an apparatus is provided including a takeout means for drawing out from a storage means, the lowermost one of ring-shaped members stacked in layers therein and holding them in such a manner that the lowermost one thereof is brought in engagement with the engaging members, there is provided a detecting means for detecting an amount of the stacked ring-shaped members in the storage means. A supplementing means is provided for replenishing the ring-shaped members in response to a decrease in a predetermined amount of the stacked ring-shaped members in the storage means, by a signal from the detecting means, so that the amount of the ring-shaped members stacked in the storage means can be controlled to be kept in the range of the predetermined number thereof. Accordingly, it can be assured that the stacked ring-shaped members in the storage means are reliably taken out one-by-one.

The invention being thus, described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A ring-shaped member supplying apparatus comprising:

storage means for storing a large number of flexible ring-shaped members stacked in layers and supporting the ring-shaped members in such a manner that the lowermost one of the stacked ring-shaped members is losely held by plural engaging members;

takeout means including a suction rod having a projection extending upwardly from a face thereon for drawing out the lowermost one of the stacked ring-shaped members in the storage means, by suction, so as to separate the ring-shaped member from the remaining members and transferring it to a conveying passage, said projection extending upwardly being located substantially in the center of said face and having a downwardly tapered edge therearound, said face having a plurality of openings therein, said face surrounding said projection engaging a tab member of said ring-shaped member when the lowermost one of the stacked ring-shaped members is drawn out, said plurality of openings in said face permitting suction to be applied to the tab member in order to separate the ring-shaped member from the remaining members;

detecting means for detecting an amount of the stacked ring-shaped members in the storage means; and supplementing means for replenishing an amount of the ring-shaped members in response to a decrease in an amount of the ring-shaped members in the storage means so that the amount of the ring-shaped members in the storage means may be controlled to be in a predetermined range, said predetermined range preventing the ring-shaped members from falling through said plural engaging members;

each said ring-shaped member comprises a ring-shaped outer part and said tab member, said tab member having a hole and projecting into a space surrounded by the ring-shaped outer part;

said takeout means being provided with said suction rod which is movable upwards from a position which is below the conveying passage, through said conveying passage and towards the tab member of the ring-shaped member constituting the lowermost layer of the stacked ring-shaped members in the storage means wherein the projection extending upwardly from said suction rod is engaged with the hole in said tab member to ensure positioning of said stacked ring-shaped member and for assisting in the drawing out of the lowermost one of the stacked ring-shaped members in the storage means while said face surrounding the projection is engaged with the tab member and suction is applied thereto through said plurality of openings.

2. The ring-shaped member supplying apparatus according to claim 1, and further including air cylinder means operatively connected to said takeout means for elevating the takeout means through said conveying passage and into engagement with the lowermost ring-shaped member in the storage means and for retracting said takeout means for discharging said ring-shaped member onto said conveying passage.

3. A ring-shaped member supplying apparatus comprising:

storage means for storing a large number of flexible ring-shaped members stacked in layers and supporting the ring-shaped members in such a manner that the lowermost one of the stacked ring-shaped members is loosely held by plural engaging members;

takeout means including a suction rod having a projection extending upwardly from a face thereon for drawing out the lowermost one of the stacked ring-shaped members in the storage means, by suction, so as to separate the ring-shaped member from the remaining members and transferring it to a conveying passage, said projection extending upwardly being located substantially in the center of said face and having a downwardly tapered edge therearound, said face having a plurality of openings therein, said face surrounding said projection engaging a tab member of said ring-shaped member when the lowermost one of the stacked ring-shaped members is drawn out, said plurality of openings in said face permitting suction to be applied to the tab member in order to separate the ring-shaped member from the remaining members;

detecting means for detecting an amount of the stacked ring-shaped members in the storage means; and supplementing means for replenishing an amount of the ring-shaped members in response to a decrease in an amount of the ring-shaped members in the storage means so that the amount of the ring-shaped members in the storage means may be controlled to be in a predetermined range, said predetermined range preventing the ring-shaped members from falling through said plural engaging members;

said supplementing means further comprises, a base frame mounted on supports above said storage means, two spur gears operatively mounted within said housing for engaging said ring-shaped members, and drive means operatively connected to said two spur gears for imparting rotation to said spur gears for engaging two distinct portions of a ring-shaped member positioned within said supplementing means and for releasing the lowermost ring-shaped member from said supplementing means into said storage means;

said takeout means being provided with said suction rod which is movable upwards from a position which is below the conveying passage, through the conveying passage and towards a tab member of the ring-shaped member constituting the lowermost layer of the stacked ring-shaped members in the storage means wherein the projection extending upwardly from said suction rod is engaged within a hole in said tab member to ensure positioning of said stacked ring-shaped member and for assisting in the drawing out of the lowermost one of the stacked ring-shaped members in the storage means while said face surrounding the projection is engaged with the tab member and suction is applied thereto through said plurality of openings.

4. The ring-shaped member supplying apparatus according to claim 3, and further including air cylinder means operatively connected to said takeout means for elevating the takeout means through said conveying passage and into engagement with the lowermost ring-shaped member in the storage means and for retracting said takeout means for discharging said ring-shaped member onto said conveying passage.

* * * * *